United States Patent
Suh et al.

(10) Patent No.: US 10,599,439 B2
(45) Date of Patent: Mar. 24, 2020

(54) METHOD AND DEVICE FOR ALLOCATING A VLIW INSTRUCTION BASED ON SLOT INFORMATION STORED IN A DATABASE BY A CALCULATION ALLOCATION INSTRUCTION

(71) Applicant: SAMSUNG ELECTRONICS CO., LTD., Suwon-si (KR)

(72) Inventors: Dong-kwan Suh, Yongin-si (KR); Suk-jin Kim, Seoul (KR); Do-hyung Kim, Hwaseong-si (KR); Tai-song Jin, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 388 days.

(21) Appl. No.: 15/125,023

(22) PCT Filed: Mar. 11, 2015

(86) PCT No.: PCT/KR2015/002354
§ 371 (c)(1),
(2) Date: Sep. 9, 2016

(87) PCT Pub. No.: WO2015/137722
PCT Pub. Date: Sep. 17, 2015

(65) Prior Publication Data
US 2017/0024216 A1    Jan. 26, 2017

(30) Foreign Application Priority Data

Mar. 12, 2014  (KR) .................... 10-2014-0029203

(51) Int. Cl.
*G06F 9/38*    (2018.01)
*G06F 9/30*    (2018.01)

(52) U.S. Cl.
CPC ........ *G06F 9/3853* (2013.01); *G06F 9/30145* (2013.01); *G06F 9/30156* (2013.01); *G06F 9/3822* (2013.01); *G06F 9/3836* (2013.01)

(58) Field of Classification Search
CPC .. G06F 9/3853; G06F 9/3822; G06F 9/30156; G06F 8/00-78
(Continued)

(56) References Cited

U.S. PATENT DOCUMENTS

| 5,179,680 A | * | 1/1993 | Colwell | ............... G06F 9/30025 |
| | | | | 711/125 |
| 5,893,143 A | * | 4/1999 | Tanaka | .................. G06F 9/3802 |
| | | | | 711/120 |

(Continued)

FOREIGN PATENT DOCUMENTS

| KR | 2000-0052594 A | 8/2000 |
| KR | 2002-0081038 A | 10/2002 |

(Continued)

OTHER PUBLICATIONS

International Search Report and Written Opinion (PCT/ISA/210 & PCT/ISA/237) dated Jun. 19, 2015 issued by the International Searching Authority in counterpart International Application No. PCT/KR2015/002354.

*Primary Examiner* — Keith E Vicary
(74) *Attorney, Agent, or Firm* — Sughrue Mion, PLLC

(57) ABSTRACT

Provided are a method and apparatus for processing a very long instruction word (VLIW) instruction. The method includes acquiring a calculation allocation instruction including information regarding whether the VLIW instructions are allocated to a plurality of slots; updating a database including the information regarding whether the VLIW instructions are allocated to the plurality of slots based on the acquired calculation allocation instruction; and allocat- (Continued)

ing at least one VLIW instruction to each of the plurality of slots based on the updated database.

13 Claims, 7 Drawing Sheets

(58) Field of Classification Search
USPC .................................. 712/24, 212; 717/149
See application file for complete search history.

(56) References Cited

U.S. PATENT DOCUMENTS

| | | | | |
|---|---|---|---|---|
| 5,930,508 | A * | 7/1999 | Faraboschi | G06F 9/30152 |
| | | | | 712/204 |
| 6,044,450 | A * | 3/2000 | Tsushima | G06F 9/30025 |
| | | | | 712/215 |
| 6,516,407 | B1 | 2/2003 | Suga et al. | |
| 6,799,266 | B1 | 9/2004 | Stotzer et al. | |
| 7,590,824 | B2 | 9/2009 | Ahmed et al. | |
| 2002/0056035 | A1 * | 5/2002 | Rozenshein | G06F 9/30018 |
| | | | | 712/208 |
| 2002/0156992 | A1 | 10/2002 | Yamana et al. | |
| 2004/0268087 | A1 * | 12/2004 | Rupley | G06F 9/3836 |
| | | | | 712/24 |
| 2007/0063745 | A1 * | 3/2007 | Leijten | G06F 9/30072 |
| | | | | 327/100 |
| 2008/0235492 | A1 * | 9/2008 | Baek | G06F 9/30156 |
| | | | | 712/24 |
| 2011/0202749 | A1 * | 8/2011 | Jin | G06F 9/3017 |
| | | | | 712/226 |
| 2013/0031337 | A1 * | 1/2013 | Larin | G06F 9/3017 |
| | | | | 712/226 |
| 2014/0317383 | A1 * | 10/2014 | Park | G06F 9/3853 |
| | | | | 712/206 |

FOREIGN PATENT DOCUMENTS

| | | |
|---|---|---|
| KR | 10-2009-0062286 A | 6/2009 |
| KR | 10-2010-0087409 A | 8/2010 |

* cited by examiner

| 610 IDENTIFICATION CODE | 620 CALCULATION ALLOCATION CODE |

METHOD AND DEVICE FOR ALLOCATING A VLIW INSTRUCTION BASED ON SLOT INFORMATION STORED IN A DATABASE BY A CALCULATION ALLOCATION INSTRUCTION

TECHNICAL FIELD

The present invention relates to a method and apparatus for processing a very long instruction word (VLIW) instruction and a method and apparatus for generating an instruction for processing a VLIW instruction.

BACKGROUND ART

In recent years, much research has been conducted on a problem of compressing code corresponding to a VLIW instruction in order to efficiently use a memory in a system for processing a VLIW instruction.

A general method used to compress code corresponding to a VLIW instruction is No Operation (NOP) compression. NOP compression may be performed in various ways. Conventionally, a separate bit was allocated to some areas of code and then NOP compression was performed. The conventional NOP compression method has a problem of limitation in space for encoding code because a separate area should be allocated to the code.

DETAILED DESCRIPTION OF THE INVENTION

Technical Problem

According to a disclosed embodiment, in order to efficiently use a memory, a method and apparatus for processing a very long instruction word (VLIW) instruction to determine a slot to which the VLIW instruction is allocated from among a plurality of slots are intended to be provided.

Technical Solution

A method of processing a VLIW instruction according to an embodiment of the present invention may include acquiring a calculation allocation instruction including information regarding whether the VLIW instruction is allocated to each of a plurality of slots, updating a database including the information regarding whether the VLIW instruction is allocated to each of the plurality of slots based on the acquired calculation allocation instruction; and allocating at least one VLIW instruction to each of the plurality of slots based on the updated database.

DESCRIPTION OF THE DRAWINGS

FIG. 6 is a view showing a calculation allocation instruction for processing a VLIW instruction according to an embodiment of the present invention.

BEST MODE

Figure 1:
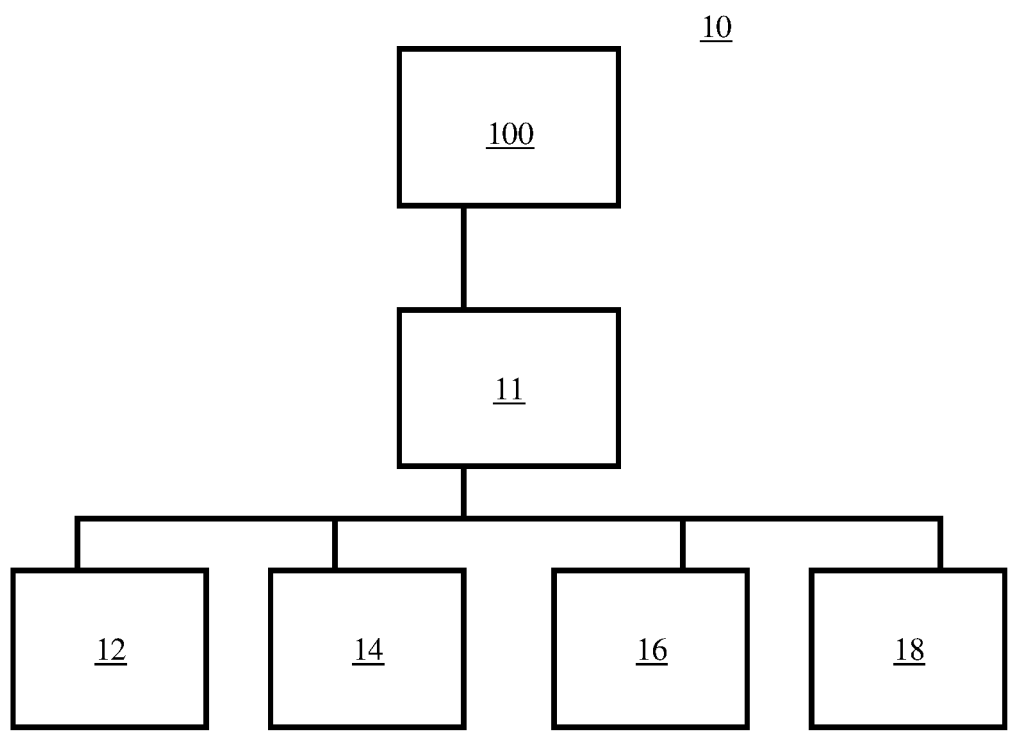
FIG. 1 is a conceptual view for describing a VLIW instruction processing system according to an embodiment of the present invention.

A method of processing a very long instruction word (VLIW) instruction according to an embodiment of the present invention may include acquiring a calculation allocation instruction including information regarding whether the VLIW instruction is allocated to each of a plurality of slots, updating a database including the information regarding whether the VLIW instruction is allocated to each of the plurality of slots based on the acquired calculation allocation instruction; and allocating at least one VLIW instruction to each of the plurality of slots based on the updated database.

In the method of processing a VLIW instruction according to an embodiment of the present invention, the calculation allocation instruction may include information regarding whether the VLIW instruction is allocated to each of the plurality of slots in each cycle in which a calculation is performed.

In the method of processing a VLIW instruction according to an embodiment of the present invention, the acquiring of a calculation allocation instruction may include acquiring a calculation instruction in a cycle which is the first cycle the VLIW instruction is not allocated to a predetermined slot.

In the method of processing a VLIW instruction according to an embodiment of the present invention, the calculation allocation instruction may have a first value when the VLIW instruction is allocated to the predetermined slot and may have a second value when the VLIW instruction is not allocated to the predetermined slot.

In the method of processing a VLIW instruction according to an embodiment of the present invention, the updating of a database may include maintaining the database initialized to the first value or changing the database from the first value to the second value based on the acquired calculation allocation instruction.

The method of processing a VLIW instruction according to an embodiment of the present invention may further include initializing the database to a first value when the at least one VLIW instruction is allocated to each of the plurality of slots.

A method of generating an instruction for processing a VLIW instruction according to an embodiment of the present invention may include determining whether the VLIW instruction is allocated to each of a plurality of slots in a first cycle; determining whether the VLIW instruction is allocated to each of the plurality of slots in the next cycle after the first cycle; and generating a calculation allocation instruction including information regarding whether the VLIW instruction is allocated to each of the plurality of slots every cycle based on a result of the determination.

In the method of generating an instruction for processing a VLIW instruction according to an embodiment of the present invention, the calculation allocation instruction may have a first value when the VLIW instruction is allocated to a predetermined slot and may have a second value when the VLIW instruction is not allocated to a predetermined slot.

An apparatus for processing a VLIW instruction according to an embodiment of the present invention may include an input/output unit configured to acquire a calculation allocation instruction including information regarding whether the VLIW instruction is allocated to each of a plurality of slots; a controller configured to update a database including the information regarding whether the VLIW instruction is allocated to each of the plurality of slots based on the acquired calculation allocation instruction; and an instruction allocation unit configured to allocate at least one VLIW instruction to each of the plurality of slots based on the updated database.

In the apparatus for processing a VLIW instruction according to an embodiment of the present invention, the calculation allocation instruction may include information regarding whether the VLIW instruction is allocated to each of the plurality of slots in each cycle in which a calculation is performed.

In the apparatus for processing a VLIW instruction according to an embodiment of the present invention, the input/output unit may acquire a calculation instruction in a cycle which is the first cycle the VLIW instruction is not allocated to a predetermined slot.

In the apparatus for processing a VLIW instruction according to an embodiment of the present invention, the calculation allocation instruction may have a first value when the VLIW instruction is allocated to the predetermined slot and may have a second value when the VLIW instruction is not allocated to the predetermined slot.

In the apparatus for processing a VLIW instruction according to an embodiment of the present invention, the controller may maintain the database initialized to the first value or change the database from the first value to the second value based on the acquired calculation allocation instruction.

In the apparatus for processing a VLIW instruction according to an embodiment of the present invention, the controller may initialize the database to the first value when the at least one VLIW instruction is allocated to each of the plurality of slots.

A apparatus for generating an instruction for processing a VLIW instruction according to an embodiment of the present invention may include a controller configured to determine whether a VLIW instruction is allocated to each of a plurality of slots in a first cycle and determine whether the VLIW instruction is allocated to each of the plurality of slots in the next cycle after the first cycle; and an instruction generating unit configured to generate a calculation allocation instruction including information regarding whether the VLIW instruction is allocated to each of the plurality of slots every cycle based on a result of the determination.

In the apparatus for generating an instruction for processing a VLIW instruction according to an embodiment of the present invention, the calculation allocation instruction may have a first value when the VLIW instruction is allocated to a predetermined slot and may have a second value when the VLIW instruction is not allocated to a predetermined slot.

MODE OF THE INVENTION

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. In the accompanying drawings, portions irrelevant to a description of the exemplary embodiments will be omitted for clarity. Moreover, like reference numerals refer to like elements throughout this disclosure.

In this disclosure, when one part (or element, device, etc.) is referred to as being "connected" to another part (or element, device, etc.), it should be understood that the former can be "directly connected" to the latter, or "electrically connected" to the latter via an intervening part (or element, device, etc.). Furthermore, when one part is referred to as "comprising (or including or having)" other elements, it should be understood that it can comprise (or include or have) only those elements, or other elements as well as those elements unless specifically described otherwise.

Hereinafter, embodiments of the present invention will be described in detail with reference to the accompanying drawings.

FIG. 1 is a conceptual view for describing a very long instruction word (VLIW) instruction processing system 10 according to an embodiment of the present invention.

Only elements associated with this embodiment are shown as being included in the VLIW instruction processing system 10 shown in FIG. 1. Accordingly, it is to be understood by those skilled in the art that general-purpose elements other than the elements shown in FIG. 1 may be further included.

Referring to FIG. 1, the VLIW instruction processing system 10 may include a VLIW instruction processing apparatus 100, an instruction queue 11, and a plurality of slots 12, 14, 16, and 18.

The VLIW instruction processing system 10 may perform a plurality of calculations at the same time. In the VLIW instruction processing system 10, the number of calculations performed every cycle may be smaller than the number of slots. For example, when meaningful calculations are not allocated to all of the slots in the VLIW instruction processing system 10, the number of calculations is smaller than the number of slots. Thus, some slots may not be used for the calculation. In this case, there may be a No Operation (NOP), which is a meaningless operation, in the slots unused for the calculations. The NOP may increase the size of code corresponding to a VLIW instruction, and the increase in the size of code may cause inefficiency in use of a cache and a memory in which the VLIW instruction is stored.

The VLIW instruction processing apparatus 100 according to an embodiment of the present invention may decode an instruction for determining a slot unused for calculation to determine the slot unused for calculation from among the plurality of slots 12, 14, 16, and 18. For convenience, the instruction for determining the slot unused for calculation will be described below as a calculation allocation instruction.

The calculation allocation instruction may be generated by a compiler (not shown) that is connectable to the VLIW instruction processing system 10. A method of generating a calculation allocation instruction for processing a VLIW instruction will be described below in detail with reference to FIG. 5.

The VLIW instruction processing apparatus 100 may decode the calculation allocation instruction acquired from the compiler (not shown) to determine whether a VLIW instruction for performing a calculation is allocated to each of a plurality of slots. Also, the VLIW instruction processing apparatus 100 may determine whether a VLIW instruction is allocated to each of a plurality of slots in a current cycle and also in cycles after the current cycle.

The VLIW instruction processing apparatus 100 may store a result of decoding the calculation allocation instruction. Also, the VLIW instruction processing apparatus 100 may receive a new calculation allocation instruction and update a database with a result of decoding the new instruction. Information regarding allocation of the VLIW instruction to each of the plurality of slots 12, 14, 16, and 18 stored in the database may be transmitted to the instruction queue 11. The instruction queue 11 may allocate the VLIW instruction to each of the plurality of slots on the basis of the received information.

The VLIW instruction processing system 10 according to an embodiment of the present invention may determine whether a predetermined VLIW instruction performs a meaningful calculation on the basis of a separate calculation allocation instruction without allocating a separate area to code corresponding to a VLIW instruction.

Figure 2:
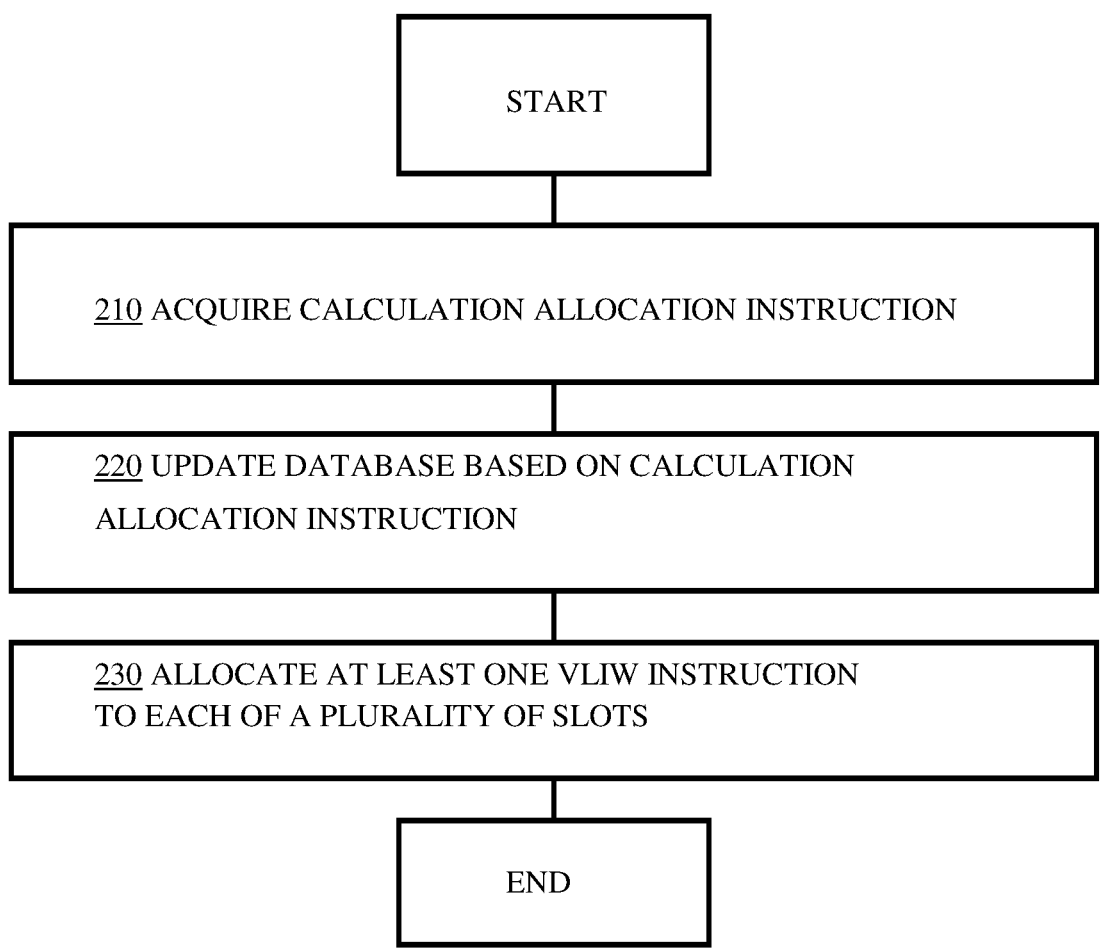
FIG. 2 is a flowchart for describing a VLIW instruction processing method according to an embodiment of the present invention.

FIG. 2 is a flowchart for describing a VLIW instruction processing method according to an embodiment of the present invention.

In step 210, the VLIW instruction processing apparatus 100 may acquire a calculation allocation instruction including the information regarding whether the VLIW instruction is allocated to each of the plurality of slots 12, 14, 16, and 18. Here, the calculation allocation instruction may include information regarding whether the VLIW instruction is allocated to each of the plurality of slots 12, 14, 16, and 18 in each cycle in which a calculation is performed. For example, when a window size of a buffer or memory in which the VLIW instruction is stored is 16, the calculation allocation instruction may include information regarding whether the VLIW instruction is allocated to each of the plurality of slots 12, 14, 16, and 18 for a maximum of 16 cycles.

Also, when the VLIW instruction is not allocated to at least one of the plurality of slots 12, 14, 16, and 18, the VLIW instruction processing apparatus 100 may acquire a calculation allocation instruction in a cycle which is the first cycle the VLIW instruction is not allocated. For example, in the first cycle, the VLIW instruction may not be allocated to the second slot 14 among the plurality of slots 12, 14, 16, and 18. In this case, the VLIW instruction processing apparatus 100 may acquire a calculation allocation instruction for the second slot 14. According to an embodiment of the present invention, when a window size of a configuration memory or buffer in which calculation allocation instructions are stored is 16, information regarding whether a VLIW instruction is allocated to the second slot 14 in each of the 16 cycles may be included in the calculation allocation instruction for the second slot 14. This will be described below in more detail with reference to FIG. 6.

In step 220, the VLIW instruction processing apparatus 100 may update a database including the information regarding whether the VLIW instruction is allocated to each of the plurality of slots on the basis of the acquired calculation allocation instruction.

The VLIW instruction processing apparatus 100 according to an embodiment of the present invention may store the database including the information regarding whether the VLIW instruction is allocated to each of the plurality of slots 12, 14, 16, and 18 in at least one cycle. The database stored in the VLIW instruction processing apparatus 100 may be initialized to a first value. Here, when a value stored in a predetermined slot in a predetermined cycle is the first value, the VLIW instruction processing apparatus 100 may determine that a VLIW instruction is allocated to the predetermined slot in the predetermined cycle. The database according to an embodiment of the present invention is initialized to the first value before performing a calculation.

When the VLIW instruction processing apparatus 100 receives the calculation allocation instruction for the second slot in a first cycle, the VLIW instruction processing apparatus 100 may update information about the second slot in the database. For example, the VLIW instruction processing apparatus 100 may update the database using information regarding whether a VLIW instruction is allocated to the second slot from the first cycle to a sixteenth cycle.

In step 230, the VLIW instruction processing apparatus 100 may allocate at least one VLIW instruction to each of the plurality of slots on the basis of the updated database.

The VLIW instruction processing apparatus 100 may transmit the VLIW instruction and also VLIW instruction allocation information to the instruction queue 11 in which at least one VLIW instruction is stored on the basis of the updated database. The instruction queue 11 may allocate the VLIW instruction to at least one slot every cycle on the basis of the received VLIW instruction allocation information.

For example, the instruction queue 11 may determine whether to allocate the VLIW instruction to the second slot from the first cycle to the sixteenth cycle on the basis of the database updated for the second slot by the VLIW instruction processing apparatus 100.

Figure 3:
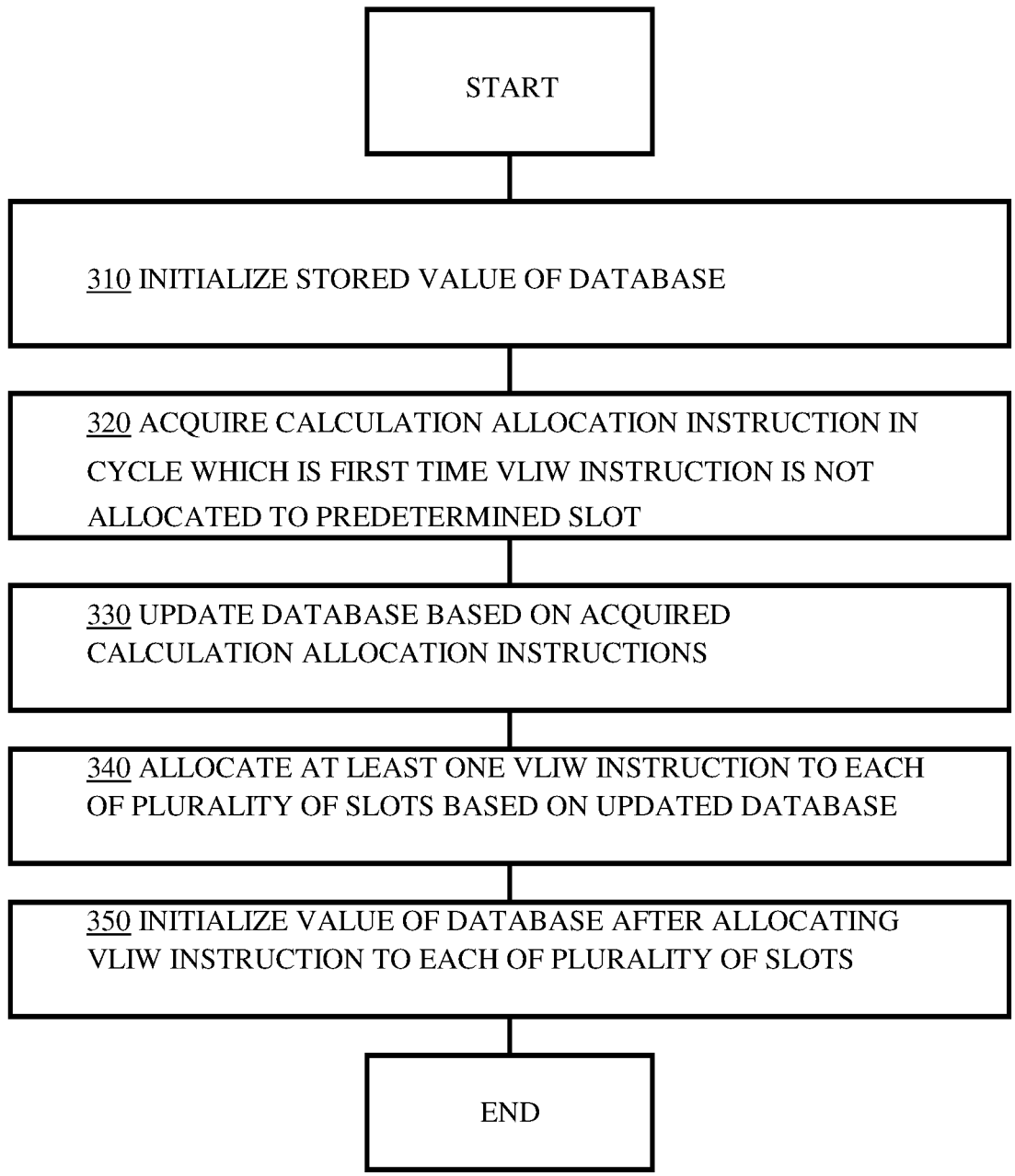
FIG. 3 is a flowchart for describing in detail a VLIW instruction processing method according to an embodiment of the present invention.

FIG. 3 is a flowchart for describing in detail a VLIW instruction processing method according to an embodiment of the present invention.

In step 310, the VLIW instruction processing apparatus 100 may initialize a value of a database. The value of the database may be set at a user's discretion.

Here, when the value of the database is a first value for a predetermined slot in a predetermined cycle, the VLIW instruction processing apparatus 100 may determine that a VLIW instruction is allocated to the predetermined slot in the predetermined cycle. According to an embodiment of the present invention, the VLIW instruction processing apparatus 100 may set values of all slots in each cycle, which are stored in the database, as the first value.

In step 320, the VLIW instruction processing apparatus 100 may acquire a calculation allocation instruction in a cycle which is the first time the VLIW instruction is not allocated to the predetermined slot. The calculation allocation instruction may include information regarding whether a VLIW instruction is allocated to a predetermined slot. However, this is merely illustrative of an embodiment of the present invention. Accordingly, one calculation allocation instruction may include information regarding whether the VLIW instruction is allocated to each of the plurality of slots 12, 14, 16, and 18.

For convenience of description, one calculation allocation instruction will be described as including information regarding whether a VLIW instruction is allocated to a predetermined slot, for example, a first slot.

Also, the VLIW instruction processing apparatus 100 may acquire a calculation allocation instruction in a cycle which is the first time the VLIW instruction is not allocated, without acquiring a calculation allocation instruction for each slot in the first cycle. For example, for a third slot, a VLIW instruction may be allocated to the third slot in a first cycle, but not in a second cycle. In this case, the VLIW instruction processing apparatus 100 may acquire a calculation allocation instruction for the third slot in the second cycle.

In step 330, the VLIW instruction processing apparatus 100 may update a database on the basis of the acquired calculation allocation instruction. Step 330 may correspond to step 220 of FIG. 2.

In step 340, the VLIW instruction processing apparatus 100 may allocate at least one VLIW instruction to each of the plurality of slots 12, 14, 16, and 18 on the basis of the updated database. Step 340 may correspond to step 230 of FIG. 3.

In step 350, the VLIW instruction processing apparatus 100 may allocate the VLIW instruction to each of the plurality of slots 12, 14, 16, and 18 and then initialize a value of the database. For example, the VLIW instruction processing apparatus 100 may allocate the VLIW instruction to each of the plurality of slots 12, 14, 16, and 18 on the basis of the database updated for the third slot 16 in the second cycle and then initialize a value of the database in the second cycle. The VLIW instruction processing apparatus 100 may initialize values of the plurality of slots 12, 14, 16, and 18 in the second cycle to a first value which indicates that a VLIW instruction has been allocated to a slot.

A method of processing a VLIW instruction according to an embodiment of the present invention, which has been described with reference to FIGS. 2 and 3, will be described in more detail.

FIGS. 4A to 4D are views showing a process of updating a database of the VLIW instruction processing apparatus 100 in each cycle according to an embodiment of the present invention.

Figures 4A, 4B, 4C, 4D:
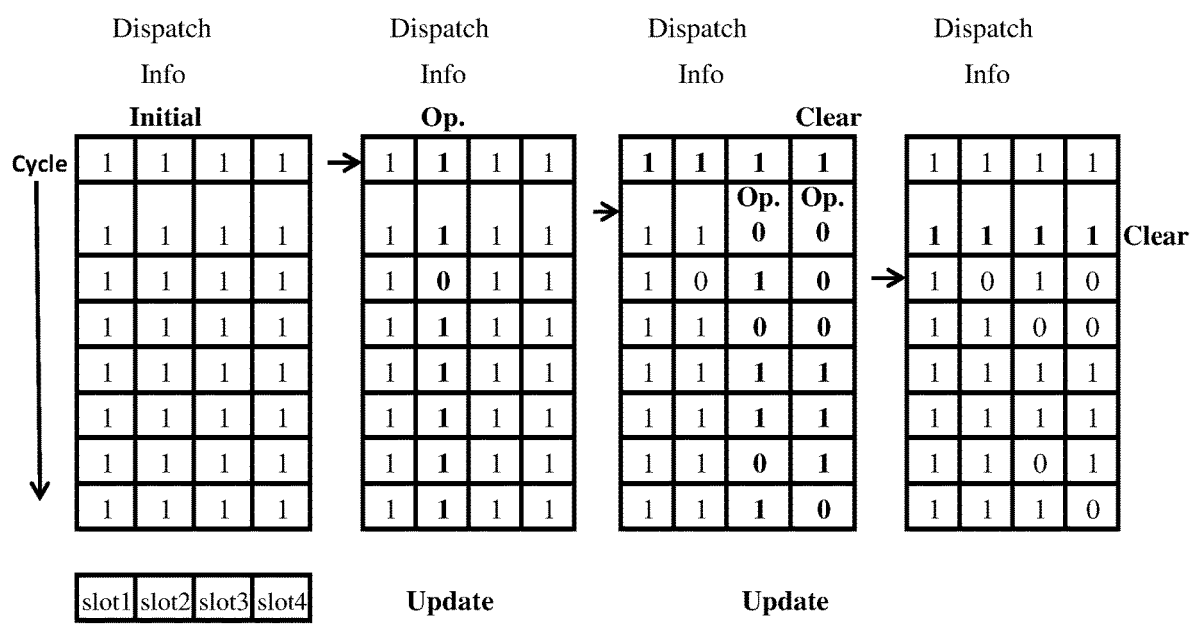
FIGS. 4A, 4B, 4C, and 4D are views showing a process of updating a database of the VLIW instruction processing apparatus in each cycle according to an embodiment of the present invention.

Referring to FIG. 4A, the VLIW instruction processing apparatus 100 may initialize all values of the database to a first value. For example, before performing a calculation, the VLIW instruction processing apparatus 100 may initialize the database to the first value, that is, 1.

Referring to FIG. 4B, a VLIW instruction may not be allocated to the second slot 14 among the plurality of slots 12, 14, 16, and 18 in the first cycle. In this case, the VLIW instruction processing apparatus 100 may acquire a calculation allocation instruction in the first cycle, which is the first time the VLIW instruction is not allocated to the second slot 14.

According to an embodiment of the present invention, when a window size of a configuration memory or buffer in which calculation allocation instructions are stored is 8, information regarding whether a VLIW instruction is allocated to the second slot 14 in each of the 8 cycles may be included in a calculation allocation instruction for the second slot 14. The VLIW instruction processing apparatus 100 may update a value corresponding to the second slot 14 in the database in each cycle on the basis of the acquired calculation allocation instruction.

According to an embodiment of the present invention, when the VLIW instruction is allocated to a predetermined slot, a value of the database may be set to be one, which is a first value. Also, when the VLIW instruction is not allocated to a predetermined slot, a value of the database may be set to be zero, which is a second value. Referring to FIG. 4B, it can be seen that the update is performed such that a value of the second slot 14 is 1 in the second cycle, 0 in the third cycle, and 1 in the fourth cycle.

Here, a VLIW instruction may be allocated to each slot, and a value for the first cycle of the second slot 14 may be initialized to 1.

Referring to FIG. 4C, a VLIW instruction may not be allocated to each of the third slot 16 and the fourth slot 18 among the plurality of slots 12, 14, 16, and 18 in the second cycle. In this case, the VLIW instruction processing apparatus 100 may acquire a calculation allocation instruction in the second cycle, which is the first time the VLIW instruction is not allocated to the third slot 16 and the fourth slot 18. The VLIW instruction processing apparatus 100 may acquire calculation allocation instructions for the third slot and the fourth slot in the second cycle and may update the database with respect to the third slot and the fourth slot from the second cycle to the eighth cycle.

In FIG. 4D, a process of initializing values of the database in slots in the previous cycle to 1 is shown. Here, the initial value may vary depending on a user's settings.

Figure 5:
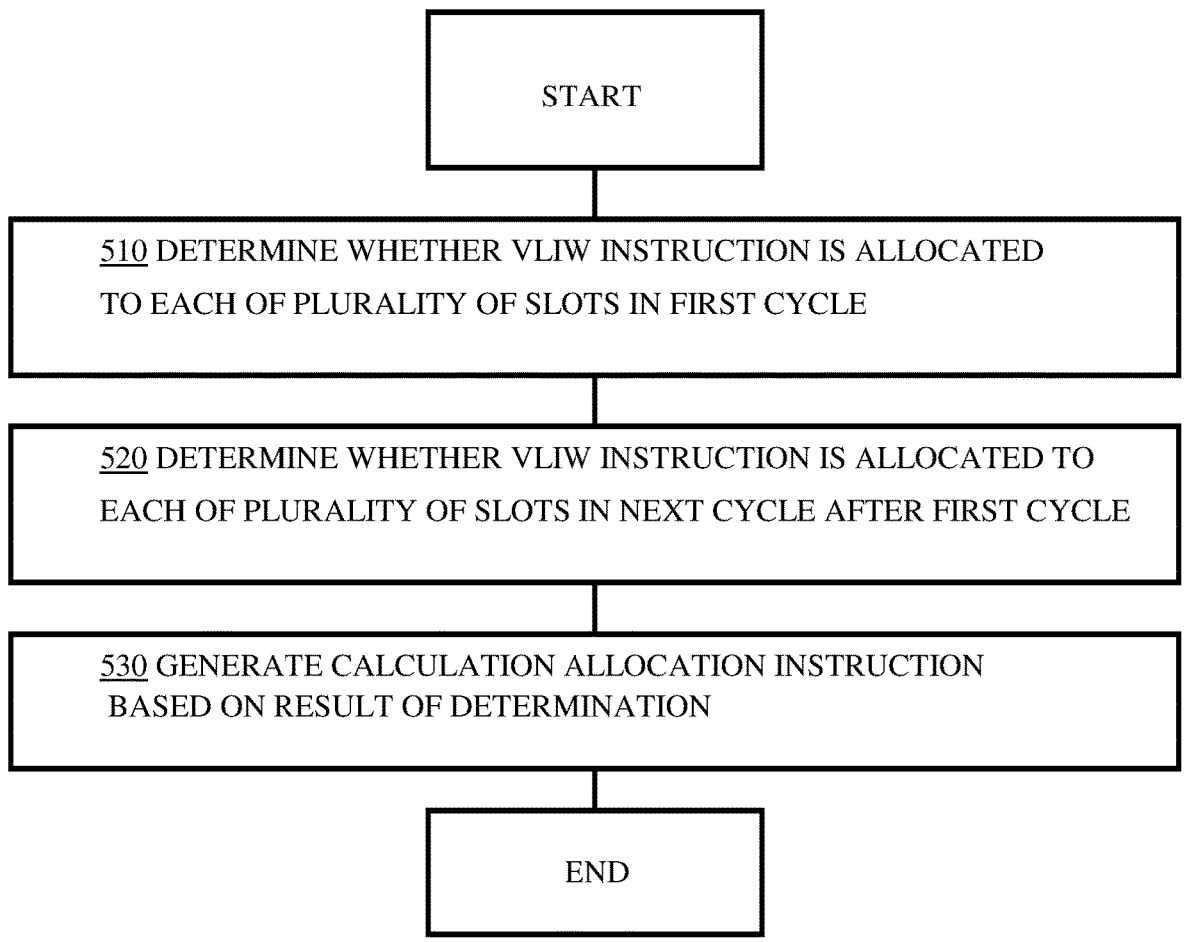
FIG. 5 is a flowchart for describing a method of generating a calculation allocation instruction for processing a VLIW instruction according to an embodiment of the present invention.

FIG. 5 is a flowchart for describing a method of generating a calculation allocation instruction for processing a VLIW instruction according to an embodiment of the present invention.

In step 510, an apparatus for generating an instruction for processing a VLIW instruction (hereinafter referred to as an instruction generating apparatus) may determine whether the VLIW instruction is allocated to each of the plurality of slots 12, 14, 16, and 18 in the first cycle. According to an embodiment of the present invention, the instruction generating apparatus may determine which calculations are performed in the first cycle at the same time. The instruction generating apparatus may also include information regarding where among the plurality of slots 12, 14, 16, and 18 each calculation is performed in addition to information regarding the calculation performed at the same time. The instruction generating apparatus may distinguish the plurality of slots 12, 14, 16, and 18 into slots to which the VLIW instruction is allocated and slots to which the VLIW instruction is not allocated, on the basis of such information.

In step 520, the instruction generating apparatus may determine whether the VLIW instruction is allocated to each of the plurality of slots 12, 14, 16, and 18 in the next cycle after the first cycle. The instruction generating apparatus may determine whether the VLIW instruction is allocated to each of the plurality of slots 12, 14, 16, and 18 every cycle from the first cycle to a predetermined cycle.

In step 530, the instruction generating apparatus may generate a calculation allocation instruction including information regarding whether the VLIW instruction is allocated to each of the plurality of slots every cycle on the basis of a result of the determination. Here, information regarding whether a VLIW instruction has been allocated to a predetermined slot, which is included in the calculation allocation instruction, may have a first value when the VLIW instruction is allocated to the predetermined slot and may have a second value when the VLIW instruction is not allocated to the predetermined slot.

According to an embodiment of the present invention, the calculation allocation instruction may include information regarding whether a VLIW instruction is allocated to a predetermined slot. However, this is merely illustrative of an embodiment of the present invention. Accordingly, one calculation allocation instruction may include information regarding whether the VLIW instruction is allocated to each of the plurality of slots 12, 14, 16, and 18.

FIG. 6 is a view showing a calculation allocation instruction 600 for processing a VLIW instruction according to an embodiment of the present invention.

The calculation allocation instruction 600 according to an embodiment of the present invention may be composed of identification code 610 that indicates a calculation allocation instruction and calculation allocation code 620 that includes information regarding whether a VLIW instruction is allocated to a predetermined slot. However, this is merely illustrative of an embodiment of the present invention. Accordingly, the present invention is not limited thereto.

The identification code 610 that indicates a calculation allocation instruction may be determined according to a user's settings. For example, when the size of the calculation allocation instruction 600 is 16 bits, 4 bits may be allocated to the identification code 610 that indicates a calculation allocation instruction, and 12 bits may be allocated to the calculation allocation code 620.

The calculation allocation code 620 may include information regarding whether a VLIW instruction is allocated to a predetermined slot every cycle. For example, when a calculation is performed for a total of 16 cycles, the fifth cycle may be the first time that the VLIW instruction is not allocated to the third slot. In this case, for the calculation allocation code for the third slot, the calculation allocation code 620 may include information regarding whether a VLIW instruction is allocated from the fifth cycle to the sixteenth cycle.

Figure 7:
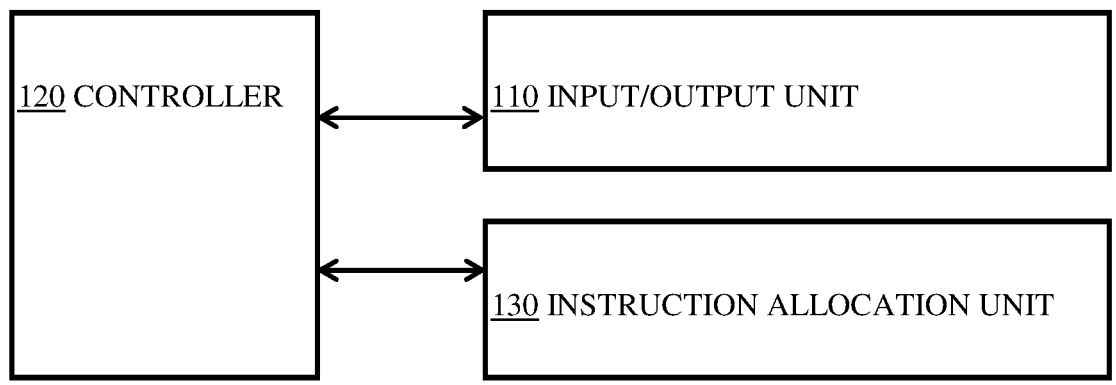
FIG. 7 is a block diagram showing a VLIW instruction processing apparatus according to an embodiment of the present invention.

FIG. 7 is a block diagram showing a VLIW instruction processing apparatus 100 according to an embodiment of the present invention.

Only elements associated with this embodiment are shown as being included in the VLIW instruction processing apparatus 100 shown in FIG. 7. Accordingly, it is to be understood by those skilled in the art that general-purpose elements other than the elements shown in FIG. 7 may be further included.

Referring to FIG. 7, the VLIW instruction processing apparatus 100 may include an input/output unit 110, a controller 120, and an instruction allocation unit 130.

The input/output unit 110 may acquire a calculation allocation instruction including information regarding whether the VLIW instruction is allocated to each of the plurality of slots 12, 14, 16, and 18. The calculation allocation instruction may include information regarding whether the VLIW instruction is allocated to each of the plurality of slots in each cycle in which a calculation is performed.

When the VLIW instruction is not allocated to at least one of the plurality of slots 12, 14, 16, and 18, the input/output unit 110 may acquire a calculation allocation instruction in a cycle which is the first time the VLIW instruction is not allocated. For example, for a third slot, a VLIW instruction may be allocated to the third slot in the first cycle, but not in the second cycle. In this case, the input/output unit 110 may acquire a calculation allocation instruction for the third slot in the second cycle. Here, the calculation allocation instruction may have a first value when the VLIW instruction is allocated to a predetermined slot and may have a second value when the VLIW instruction is not allocated to a predetermined slot.

The controller 120 may update the database including information regarding whether the VLIW instruction is allocated to each of the plurality of slots 12, 14, 16, and 18 on the basis of the acquired calculation allocation instruction. The controller 120 may maintain the database initialized to the first value or change the database from the first value to the second value on the basis of the acquired calculation allocation instruction.

Also, the controller 120 may allocate the VLIW instruction to each of the plurality of slots 12, 14, 16, and 18 and then may initialize a value of the database. For example, the controller 120 may initialize a value of the database in the second cycle to the first value after the instruction allocation unit 130 allocates the VLIW instruction to each of the plurality of slots 12, 14, 16, and 18 on the basis of the database updated for the third slot 16 in the second cycle.

The instruction allocation unit 130 may allocate at least one VLIW instruction to each of the plurality of slots on the basis of the updated database. The instruction allocation unit 130 may transmit VLIW instruction allocation information to the instruction queue 11 in which at least one VLIW instruction is stored, on the basis of the updated database. The instruction queue 11 may allocate the VLIW instruction to at least one slot every cycle on the basis of the received VLIW instruction allocation information.

Figure 8:
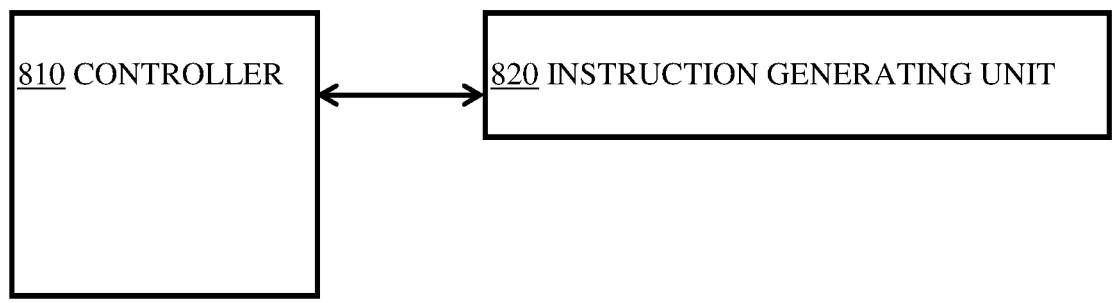
FIG. 8 is a block diagram showing an instruction generating apparatus according to an embodiment of the present invention.

FIG. 8 is a block diagram showing an instruction generating apparatus 800 according to an embodiment of the present invention.

Only elements associated with this embodiment are shown as being included in the instruction generating apparatus 800 shown in FIG. 8. Accordingly, it is to be understood by those skilled in the art that general-purpose elements other than the elements shown in FIG. 8 may be further included.

Referring to FIG. 8, the instruction generating apparatus 800 may include a controller 810 and an instruction generating unit 820.

The controller 810 may determine whether the VLIW instruction is allocated to each of the plurality of slots 12, 14, 16, and 18 in a first cycle. According to an embodiment of the present invention, the controller 810 may determine which calculations are performed in the first cycle at the same time. The controller 810 may also include information regarding where among the plurality of slots 12, 14, 16, and 18 each calculation is performed in addition to information regarding the calculation performed at the same time. The controller 810 may distinguish the plurality of slots 12, 14, 16, and 18 into slots to which the VLIW instruction is allocated and slots to which the VLIW instruction is not allocated, on the basis of such information.

Also, the controller 810 may determine whether the VLIW instruction is allocated to each of the plurality of slots 12, 14, 16, and 18 in the next cycle after the first cycle. The controller 810 may determine whether the VLIW instruction is allocated to each of the plurality of slots 12, 14, 16, and 18 every cycle from the first cycle to a predetermined cycle.

The instruction generating unit 820 may generate a calculation allocation instruction including information regarding whether the VLIW instruction is allocated to each of the plurality of slots every cycle on the basis of a result of the determination. Here, information regarding whether a VLIW instruction has been allocated to a predetermined slot, which is included in the calculation allocation instruction, may have a first value when the VLIW instruction is allocated to the predetermined slot and may have a second value when the VLIW instruction is not allocated to the predetermined slot.

According to an embodiment of the present invention, the calculation allocation instruction may include information regarding whether a VLIW instruction is allocated to a predetermined slot. However, this is merely illustrative of an embodiment of the present invention. Accordingly, one calculation allocation instruction may include information regarding whether the VLIW instruction is allocated to each of the plurality of slots 12, 14, 16, and 18.

The apparatus described herein may include a processor, a memory for storing and executing program data, a permanent storage such as a disk drive, a communication port for communicating with external devices, and user interface devices, including a touch panel, keys, buttons, etc. When software modules or algorithms are involved, these software modules may be stored as program instructions or computer readable code executable in the processor on a computer-readable medium. Examples of the computer-readable recording medium include magnetic storage media (e.g., a read-only memory (ROM), a random-access memory (RAM), a floppy disk, a hard disk, etc.), and optical recording media (e.g., a CD-ROM, a digital versatile disc (DVD), etc.). The computer-readable recording medium can also be distributed over network-coupled computer systems so that the computer-readable code is stored and executed in a distributed fashion. This media can be read by the computer, stored in the memory, and executed by the processor.

All references, including publications, patent applications, and patents, cited herein are hereby incorporated by reference to the same extent as if each reference was individually and specifically indicated to be incorporated by reference and was set forth in its entirety herein.

For the purposes of promoting an understanding of the principles of the invention, reference has been made to example embodiments illustrated in the drawings, and specific language has been used to describe these embodiments. However, no limitation of the scope of the invention is intended by this specific language, and the invention should be construed to encompass all embodiments that would normally be thought of by one of ordinary skill in the art.

The invention may be described in terms of functional block components and various processing steps. Such functional blocks may be realized by any number of hardware and/or software components configured to perform the specified functions. For example, the invention may employ various integrated circuit (IC) components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that are executed in one or more processors. Furthermore, the invention could employ any number of conventional techniques for electronics configuration, signal processing and/or control, data processing and the like. The words "mechanism," "element," "means," and "configuration" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems may not be described in detail. Furthermore, the connecting lines, or connectors shown in various figures presented are intended to represent exemplary functional relationships, physical connections or logical couplings between the various elements. It should be noted that many alternative or additional functional relationships, physical connections or logical connections may be present in a practical apparatus. Moreover, no item or component is essential to the practice of the invention unless the element is specifically described as "essential" or "critical."

The invention claimed is:

1. A method of processing a very long instruction word (VLIW) instruction, the method comprising:
   acquiring a calculation allocation instruction including information regarding whether a part of the VLIW instruction is to be allocated to each slot of a plurality of slots;
   updating a database to store the information regarding whether a part of the VLIW instruction is to be allocated to each slot of the plurality of slots included in the acquired calculation allocation instruction;
   obtaining the information regarding whether a part of the VLIW instruction is to be allocated to each slot of the plurality of slots from the database;
   identifying at least one slot to which at least one part of the VLIW instruction is to be allocated based on the obtained information from the database; and
   allocating the VLIW instruction to the identified at least one slot to which the at least one part of the VLIW instruction is to be allocated.

2. The method of claim 1, wherein the calculation allocation instruction includes information regarding whether a part of a VLIW instruction is to be allocated to each slot of the plurality of slots during each cycle of a plurality of cycles that a VLIW instruction calculation is to be performed.

3. The method of claim 2, wherein the acquiring of the calculation allocation instruction comprises acquiring the calculation allocation instruction in a cycle which is a first time that at least one of the plurality of slots is not used in an allocation of a VLIW instruction.

4. The method of claim 1, wherein
   the calculation allocation instruction has a first value for a first slot based on a part of the VLIW instruction being allocated to the first slot and has a second value for the first slot based on the first slot not being used in the allocation of the VLIW instruction, and
   the first value is different from the second value.

5. The method of claim 4, wherein the updating of the database comprises changing a slot entry in the database based on the acquired calculation allocation instruction.

6. The method of claim 4, wherein the first value is a first binary value and the second value is a second binary value.

7. A non-transitory computer-readable recording medium having recorded thereon a computer program for executing the method of claim 1.

8. An apparatus for processing a very long instruction word (VLIW) instruction, the apparatus comprising:
   at least one hardware processor configured to:
      acquire a calculation allocation instruction including information regarding whether a part of the VLIW instruction is to be allocated to each slot of a plurality of slots;
      update a database to store the information regarding whether a part of the VLIW instruction is to be allocated to each slot of the plurality of slots included in the acquired calculation allocation instruction;
      obtain the information regarding whether a part of the VLIW instruction is to be allocated to each slot of the plurality of slots from the database;
      identify at least one slot to which at least one part of the VLIW instruction is to be allocated based on the obtained information from the database; and
      allocate the VLIW instruction to the identified at least one slot to which the at least one part of the VLIW instruction is to be allocated.

9. The apparatus of claim 8, wherein the calculation allocation instruction includes information regarding whether a part of a VLIW instruction is to be allocated to each slot of the plurality of slots during each cycle of a plurality of cycles that a VLIW instruction calculation is to be performed.

10. The apparatus of claim 9, wherein the at least one hardware processor acquires the calculation allocation instruction in a cycle which is a first time that at least one of the plurality of slots is not used in an allocation of a VLIW instruction.

11. The apparatus of claim 8, wherein
the calculation allocation instruction has a first value for a first slot based on a part of the VLIW instruction being allocated to the first slot and has a second value for the first slot based on the first slot not being used in the allocation of the VLIW instruction, and
the first value is different from the second value.

12. The apparatus of claim 11, wherein the at least one hardware processor changes a slot entry in the database from the first value to the second value based on the acquired calculation allocation instruction.

13. The apparatus of claim 11, wherein the first value is a first binary value and the second value is a second binary value.

* * * * *